United States Patent
Imatani et al.

(10) Patent No.: US 8,153,048 B2
(45) Date of Patent: Apr. 10, 2012

(54) METHOD AND DEVICE FOR MANUFACTURING CONTAINER BY COMPRESSION MOLDING AND STRETCH BLOW MOLDING

(75) Inventors: Tsuneo Imatani, Yokohama (JP); Hiroyuki Hashimoto, Yokohama (JP); Makoto Etoh, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 796 days.

(21) Appl. No.: 10/576,148

(22) PCT Filed: Oct. 8, 2004

(86) PCT No.: PCT/JP2004/015312
§ 371 (c)(1),
(2), (4) Date: Apr. 9, 2007

(87) PCT Pub. No.: WO2005/037526
PCT Pub. Date: Apr. 28, 2005

(65) Prior Publication Data
US 2008/0042325 A1    Feb. 21, 2008

(30) Foreign Application Priority Data
Oct. 17, 2003    (JP) ................................. 2003-358577

(51) Int. Cl.
*B29C 49/08*    (2006.01)
(52) U.S. Cl. ................... 264/532; 264/148; 264/211.12; 264/319; 264/320; 428/410; 428/522
(58) Field of Classification Search .................. None
See application file for complete search history.

(56) References Cited

U.S. PATENT DOCUMENTS

| | | | | |
|---|---|---|---|---|
| 4,407,651 A | * | 10/1983 | Beck et al. | 432/11 |
| 5,762,854 A | * | 6/1998 | Valyi | 264/255 |
| 6,716,386 B2 | * | 4/2004 | Saito et al. | 264/532 |
| 2002/0088767 A1 | * | 7/2002 | Saito et al. | 215/40 |
| 2007/0007694 A1 | * | 1/2007 | Nemoto et al. | 264/319 |

FOREIGN PATENT DOCUMENTS

| | | |
|---|---|---|
| JP | 61-108509 A | 5/1986 |
| JP | 6-278195 A | 10/1994 |
| JP | 11-170352 A | 6/1999 |
| JP | 2000-25729 A | 1/2000 |
| JP | 2001-179813 A | 7/2001 |
| JP | 2003-291205 A | 10/2003 |

OTHER PUBLICATIONS

International Search Report of International Application PCT/JP2004/015312 mailed Jan. 18, 2005.

* cited by examiner

*Primary Examiner* — Monica A Huson
(74) *Attorney, Agent, or Firm* — Westerman, Hattori, Daniels & Adrian, LLP

(57) ABSTRACT

The present invention relates to manufacture of container product with a constant level of quality, wherein the performance is constant, by resolving problems including transformation of perform performance caused by the temperature variation of the preform; or by the variation in the stretching blow molding due to a thermal difference between the surface and the inner part of the preform, resulting from the thickness thereof, in order to industrialize a new molding method recognized to be an excellent molding method from the point of view of economic efficiency and production efficiency, wherein compression molding and stretch blow molding are performed continuously. By a method or device for manufacturing continuously synthetic resin containers, preforms are molded by compression with a compression molding machine, then stretch blow molding is performed with a stretch blow molding machine. After discharging molded preforms from the compression molding machine, an even-heating treatment of preforms, a partial heating or partial cooling treatment according to need and then stretch blow molding are performed.

11 Claims, 2 Drawing Sheets

METHOD AND DEVICE FOR MANUFACTURING CONTAINER BY COMPRESSION MOLDING AND STRETCH BLOW MOLDING

TECHNICAL FIELD

The present invention relates to a method and a device for manufacturing a synthetic resin container by compression molding and stretch blow molding, and relates to a method and a device for manufacturing a synthetic resin container, comprising the steps of performing compression-molding to a molten body of synthetic resin with a compression molding machine to make a preform, and performing a particular heating treatment to the preform according to need, and further performing consecutively stretch-blow molding with a stretch-blow molding machine.

BACKGROUND ART

Plastic containers are versatile for daily use as containers for beverages or food, due to their lightness in weight, economic efficiency, or excellent properties or adaptability to environmental problems. Especially, containers molded from polyethylene terephthalate (PET) are highly-demanded for containers for drinking water or soft drinks due to their excellent mechanical properties or transparency, and recently, they are quite regularly used by consumers as potable small containers and further as containers for hot drinks.

Synthetic resin containers as represented by polyethylene terephthalate (PET), which are very important as containers for drinking water and food in daily life, as stated above, are efficiently manufactured by stretch blow molding (sometimes referred simply to as stretch molding or blow molding) usually, wherein fluid are injected into preforms (pre-molded bottomed cylindrical molding materials) in molding dies, and then inflated and molded.

Conventionally, molding of preforms as molding materials of plastic containers and manufacture of containers were conducted mainly by molding preforms to multi-cavity molds by injection molding and then by performing stretch-blow molding to make container product. However, in this method, as the temperature of preforms were once cooled down or reduced to around room temperature, and the whole or body part of the preform were reheated afterwards before performing stretch blow molding, there are still problems including significant loss of heat energy for reheating, or cost burden of reheating facilities. Recently, technical demands for manufacturing economically excellent containers with higher performance and for increasing production efficiency have increased; therefore, development of better manufacturing methods or manufacturing devices are awaited in order to reduce the price of molding devices, increase production efficiency, or transit to low-temperature molding, etc.

As one solution, an injection stretch-blow molding, performing blow molding without reheating the preform immediately after injection molding (see for example, Japanese Laid-Open Patent Application No. 52-82967 (claim 1 and lower right column of page 1)) has been developed, while higher productivity cannot be realized as the consistency of time between the duration for injection molding and stretching blow molding is not good. Further, a method comprising the steps of molding a plurality of preforms at once by multi-cavity molds with an injection molding machine, and then performing stretch-blow molding immediately thereafter has been also developed. However, there are still problems including that container product with a constant level of quality are hardly obtained, as it is difficult to avoid transformation of performance caused by the temperature variation of the preform in the heat history difference, due to the time lag while waiting the molding order of the stretching blow molding machine; or by the variation in the stretching blow molding due to a thermal difference between the surface and the inner part of the preform, resulting from the thickness thereof.

Thus, in order to solve these technical problems of injection stretch-blow molding, a large number of proposition for amelioration has been disclosed so far, and the following improved methods can be exemplified: a method for reducing the injection molding cycle time, and improving operation ratio of a blow cavity, wherein the preform is cooled down, transported by a system continued from a transporting station to a molding station, and heated to perform stretch-blow molding (see Japanese Laid-Open Patent Application No: 11-165347 (Abstract)); and a method for improving credibility and speed of molding by providing a cooling station and a heating station for preforms, and converting the transporting pitch between the preforms to a stretch blow molding pitch (see Japanese Laid-Open Patent Application No. 2002-337216 (Abstract)).

On the other hand, a compression molding machine has been proposed as a molding device which is less expensive than an injection molding device, which could be downsized, and which enables molding at a low temperature, and a rotary compression molding machine (a rotary-and movable type compression molding machine) (see Japanese Laid-Open Patent Application No. 60-245517 (claim 1)) wherein a plurality of molding dies are mounted on a rotating disk has been developed and applied, in order to enhance their mass productivity to improve their production efficiency. Further, a molding method supplying materials by extrusion and using the rotary type-compression molding machine (see Japanese Laid-Open Patent Application No. 2000-25729 (claim 1 and FIG. 1)) has been developed as a method for molding preforms by using rotary-type compression molding machines. Production efficiency has improved dramatically by applying the rotary-type molding machine, and recently, the molding method by extrusion compression molding appears to be the most promising method for manufacturing preforms.

As stated above, in the injection stretch blow molding of plastic containers, even by manufacturing a large amount of preforms with a multi-cavity molds by injection molding method, there are still problems including that container product with a constant level of quality are hardly obtained, resulting from the transformation of performance caused by the temperature variation of the preform up to stretch blow molding; or by the variation in the stretching blow molding due to a thermal difference between the surface and the inner part of the preform, resulting from the thickness thereof. In order to solve these technical problems, a large number of proposition for amelioration has been disclosed so far, while it is hard to say that problems including transformation of performance caused by the temperature variation of the preform in the heat history difference, or the variation in the stretching blow molding due to a thermal difference between the surface and the inner part of the preform, resulting from the thickness thereof have been resolved sufficiently.

On the other hand, in a compression molding machine which is less expensive than an injection molding device, which could be downsized, and which enables molding at a low temperature, a rotary compression molding machine for preforms wherein a plurality of molding dies are mounted on a rotating disk has been developed and good results for economic efficiency and production efficiency were obtained.

However, even a method for manufacturing consecutively containers by combining stretch blow molding with compression molding to further improve molding methods has been conceived, the method has not been disclosed at all.

Moreover, by applying a new method for manufacturing containers which combines compression molding with stretch blow molding, to make a system continued from compression molding to stretch blow molding, the reheating device for preforms to be used before stretch blowing would be unnecessary, and thus generating an economic effect as the energy necessary for heating preforms would be omitted. Further, as the compression molding machine and the stretch blow molding machine are independent each other, higher productivity having excellent consistency in molding speed can be realized by setting independently the number of molding dies according to the molding speed. However, in contrast of these merits, there are still problems that are not resolved, including that container product with a constant level of quality are hardly obtained, as it is difficult to avoid transformation of performance caused by the temperature variation of the preform; or by the variation in the stretching blow molding due to a thermal difference between the surface and the inner part of the preform, resulting from the thickness thereof.

In the light of the above condition in the technology of manufacturing synthetic resin containers by stretch blow molding, in order to industrialize a new molding method wherein compression molding is combined continuously with stretch blow molding, which is an excellent method from the view of economic efficiency or production efficiency, the object which the present invention targets is, to manufacture with high producibility container product with a constant level of quality, by this new molding method, by resolving problems including transformation of performance caused by the temperature variation of the preform; or by the variation in the stretching blow molding due to a thermal difference between the surface and the inner part of the preform, resulting from the thickness thereof, in the molding method.

DISCLOSURE OF THE INVENTION

For the compression molding machine which is less expensive than an injection molding device, which could be downsized, and which enables molding at a low temperature, a rotary compression molding machine wherein a plurality of molding dies are mounted on a rotating disk has been developed, and their mass productivity has been enhanced and production efficiency has been improved. The machine has been applied also for molding preforms. As this method for molding preforms (or the molding device) is an excellent molding method from the point of view of economic efficiency and production efficiency, the present inventors have conceived to industrialize a new method for molding by combining continuously this method for molding preforms with stretch blow molding, to make a system continued from compression molding to stretch blow molding, and to realize high-producibility of preforms.

In order to resolve problems in the technique of their new concept, including that container product with a constant level of quality are hardly obtained, as it is difficult to avoid transformation of the perform performance caused by the temperature variation of preforms; or by the variation in the stretching blow molding due to a thermal difference between the surface and the inner part of the preform, resulting from the thickness thereof, the present inventors made a keen study to find out resolutions from various points of view including, supply of molding drops, material of preforms, or molding conditions of each molding method, or heating treatment of preforms, and compression stretch blow molding cycle, in order to develop a new and improved technology.

Thus, as a result of making experimental considerations and trials from multilateral thinking and discussion, the present inventors recognized that the above problems were associated significantly with the heating treatment of preforms, and reached to the present invention having a particular heating treatment of preforms after compression molding as a fundamental element in the new molding method, which combines continuously the preform molding method with the stretch blow molding. Thus, the present invention has been completed.

It can be said that the combination of the new molding method combining continuously preform molding method with stretch blow molding, and the particular heating treatment of preforms after compression molding is a remarkable concept.

During the process, when considering the heating treatment of preforms, the present inventors performed an even-heating treatment of preforms, in other words a homogeneous heating treatment (in particular to the body part of the preform) in order to homogenize the heat history for each preform molded continuously or to homogenize the heat history for each part of preform, instead of performing usually conceived heating treatment to preforms molded by compression. Thus, they found out a new method that could be evaluated as a particular concept.

The even-heating treatment relates to homogenize and stabilize the thermal properties including potential heat of preform, by placing each preform in a certain heat atmosphere (by performing heating treatment by heat atmosphere). By an even heating treatment, potential heat of each preform after compression molding would be constant and preforms will be sent to stretch blow molding process in that condition. Thus, homogeneous blow molding can be realized, and synthetic resin containers with a constant level of quality can be manufactured continuously. Further, the temperature of each part (body part or bottom part) of each preform, immediately after compression molding, is higher in the intermediate layer compared to inner and outer layers. However, with the even-heating treatment in which each preform is placed in a certain heat atmosphere, it is possible to homogenize the temperature of the preform in the thickness direction during the time up to stretch blow molding, and to mold containers having homogeneous layers.

Further, in the present invention, in addition to the even-heating treatment, adding a partial heating treatment and/or partial cooling treatment to the preforms according to need is another constitution, so that it is possible to adjust (make minor arrangements) the thermal conditions (thermal properties) of preforms according to stretch blow conditions, by performing partial heating and/or cooling treatment to the preforms as a supplemental heating treatment.

Furthermore, in the present invention, in order to mold preforms continuously and to enhance the production efficiency, a rotary-and movable type drop supply comprising a plurality of holding mechanism that holds and carries a determined amount of drops, and provides thereof to the molding dies of the compression molding machine is preferably used. Thus, a continuous molding system, wherein:

the compression molding machine is a rotary movable type with a plurality of molding dies comprising male and female dies;

the even-heating mechanism of preforms is an even-heating treatment device which is a rotary movable type and treats a plurality of preforms; and the stretch blow molding machine is a rotary-type stretch blow molding machine that performs stretch blow molding continuously to a plurality of preforms, is applied In the present invention, a method wherein the compression molding of preforms is combined with stretch blow molding to make a compression stretch blow molding has been industrialized, to make a system continued from compression molding to stretch blow molding in order to realize excellent production efficiency of preforms. Further, by the new heating technology, problems including transformation of performance caused by the temperature variation of the preform; or by the variation in the stretching blow molding due to a thermal difference between the surface and the inner part of the preform, resulting from the thickness thereof, could be resolved and thus, container product with a constant level of quality could be produced with high efficiency. (Meanwhile, the term stretch blow molding used in the present specification, etc., has the same meaning as that of normal stretch molding or blow molding.)

The process of finding out the present invention, and the basic constitutions and features of the present invention have been schematically described in the above. Here, when the present invention is overviewed, it consists of the following group of units of inventions, wherein inventions [1], [2] and [4] are basic inventions, while other inventions give shape and embodiment to [1] to [4]. (Meanwhile, "the present invention" refers to the group of inventions as a whole.)

[1] A method for manufacturing a synthetic resin container, comprising the steps of forming a preform by performing compression molding to a drop which is a synthetic resin molten lump with a compression molding machine, and performing continuously stretch blow molding to the preform with a stretch blow molding machine.

[2] The method for manufacturing a synthetic resin container according to [1], comprising the steps of discharging the preform maintaining the heat conferred at the time of molding from the compression molding machine, and performing an even-heating treating of preform, and then stretch blow molding.

[3] The method for manufacturing a synthetic resin container according to [2], wherein the even-heating treatment is a heating treatment and/or cooling treatment.

[4] A device for manufacturing a synthetic resin container comprising the steps of performing compression molding to the preform with a compression molding machine, and then continuously stretch-blow molding with a stretch-blow molding machine, wherein a cutting means of drops which is a synthetic resin molten lump extruded from an extrusion opening of an extruding means; a supplying means; a compression molding machine; a preform-discharging means; an even-heating mechanism of preforms; a stretch blow molding machine; and a container product discharging means are constituted to be a continuous system.

[5] The method or device for manufacturing a synthetic resin container according to any one of [2] to [4], wherein a partial heating and/or partial cooling treatment or a partial heating and/or partial cooling mechanism is further added to the even-heating treatment or the even-heating mechanism of preforms, according to the temperature of the body part of the preform.

[6] The method or device for manufacturing a synthetic resin container according to any one of [2] to [5], wherein a process to heat and crystallize a neck part of the container is further added.

[7] The method or device for manufacturing a synthetic resin container according to any one of [2] to [6], wherein:

the drop supplying method and means is a rotary—and movable means provided with a plurality of drop holding/carrying methods and drop holding/carrying mechanisms, which holds and carries a determined quantity of drop, which is made by cutting molten synthetic resin extruded from an extrusion opening, and provides to molding dies of a compression molding machine;

the compression molding machine is a rotary compression molding machine which uses a rotary- and movable type with a plurality of molding dies comprising male and female dies;

the even-heating mechanism of preforms is a rotary-type treating mechanism which treats a plurality of preforms; and the stretch blow molding machine is a rotary-type stretch blow molding machine that performs stretch blow molding continuously to a plurality of preforms.

[8] The method or device for manufacturing a synthetic resin container according to any one of [1] to [7], wherein the stretch blow molding is a double-axis stretch blow, or a two-step blow, and that the synthetic resin container is a bottle or a cup.

BEST MODE OF CARRYING OUT THE INVENTION

The present invention has been explained according to the fundamental constitution as a means to solve the problems in the above, and in the following, the preferred embodiments of the groups of the present invention mentioned above will be specifically described in detail referring to each of the drawings presenting prototypes of the embodiments.

The present invention relates to a method and device for manufacturing a synthetic resin container by compression stretch blow molding, and relates to a method and device for manufacturing a synthetic resin container by performing compression molding to preforms with a compression molding machine, a particular heating treatment of preforms, and continuously stretch-blow molding with a stretch blow machine.

(1) Fundamental Constitution of the Present Invention

The molding system in the fundamental constitution of the present invention, comprises as backbone, firstly, a compression molding process, an even-heating process of preforms, and a stretch blow molding; secondly, a compression molding process, an even-heating process of preforms, a partial heating and/or cooling treatment process of preforms, and a stretch blow molding process.

Figure 1:
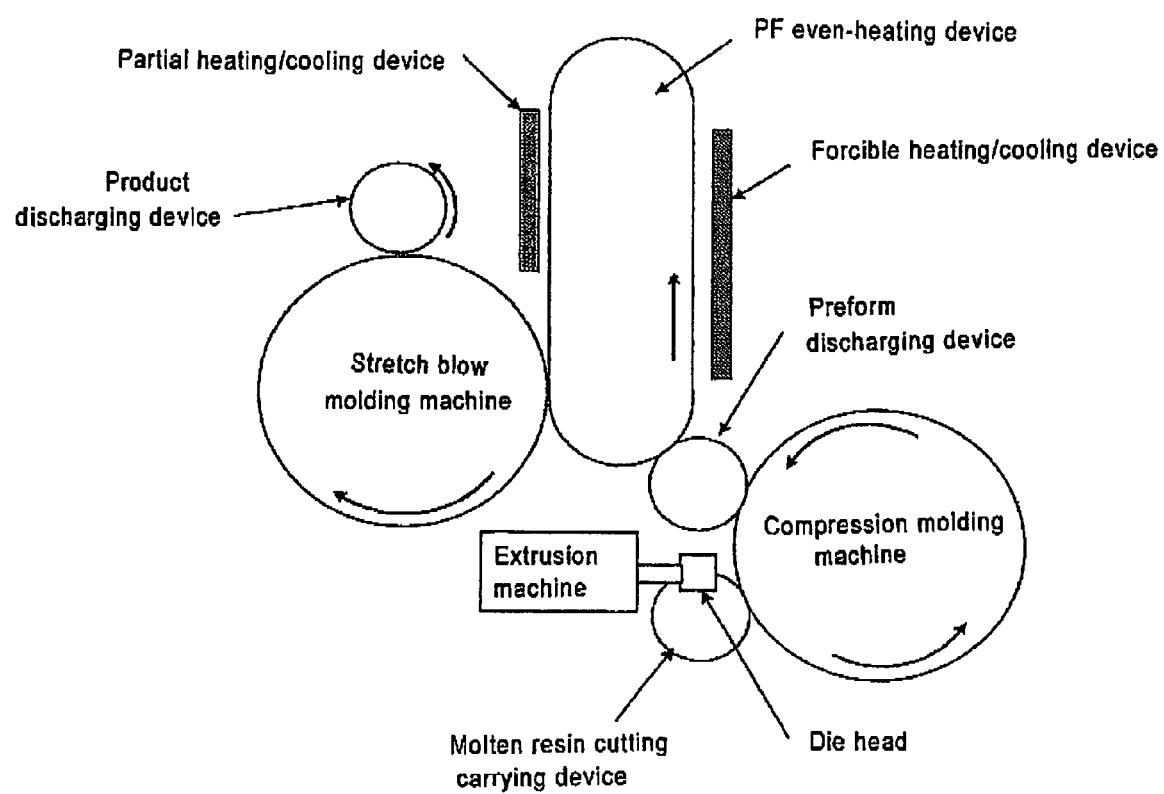
FIG. 1 is a schematic plain view that specifically illustrates a preferred embodiment of the molding system which is constituted according to the present invention.

The molding system in the fundamental constitution is illustrated as a molding process flow chart in the schematic frame pattern of FIG. 1.

(2) Fundamental Elements of the Present Invention
2-1 Synthetic Resin

As resin materials for molding preforms of the present invention, any moldable thermoplastic resin may be used. Examples of resin include: thermoplastic polyester such as polyethylene terephthalate (PET), polybutylene terephthalate (PBT), polyethylene naphthalate (PEN); polyester copolymers having these ester units as main constituent, or mixture thereof; polycarbonates; acryl-butadiene-styrene copolymer (ABS resin); polyacetal resin; nylons including nylon 6, nylon 66, or nylon copolymers thereof; acryl resin including polymethyl methacrylate; isotactic/polypropylene; polystyrene; low-, medium-, or high-density polyethylene; ethylene-propylene copolymer; ethylene-butene-1 copolymer, and styrene-butadiene thermoplastic elastomer. Various additives, for example, coloring agents, ultraviolet absorbers, releasing agents, lubricants, nucleant agents can be added to these resins in an amount that does not affect the quality of the product.

Further, preforms of the present invention can be constituted not only by thermoplastic resin layers with a monolayer (single layer), but also by a thermoplastic resin layers with two or more layers.

Moreover, the preform of the present invention can provide an intermediate layer laminated between the inner layer and the outer layer comprising two or more thermoplastic resin layers, and the intermediate layer can be an oxygen barrier layer or an oxygen absorbing layer.

2-2 Even-Heating Treatment of Preforms

In the present invention, it is important to perform an even-heating treatment of preforms molded by compression (homogeneous heating treatment, in particular to the body part of the preform), in order to homogenize heat history of each preform, or to homogenize heat history of each part of the preform, and not a simple heating treatment that may usually be conceived in an injection molding preform.

Even-heating treatment includes heating treatment or cooling treatment, or combination thereof, and further to leave the preforms at room temperature instead of performing heating or cooling forcibly.

By considering specifically the even-heating treatment of preforms to the preforms after compression molding, the preform after compression molding is tied to a core (male die), and the core is extracted while the nozzle part (screw part) periphery of the container is tied by the nozzle part molding split die (female die). The surface temperature of the nozzle part at that time is, when synthetic resin is polyester PET, preferably 80° C. or under (more preferable 60° C. or under), and when the temperature exceeds 80° C., the resin softens and the nozzle part changes its form. On the other hand, if the surface temperature of the body part of the preform is 120° C. or under (more preferably 80° C. or under), it is possible to extract the preform without being transformed, but as the inner temperature of the preform is higher than that of the surface, if it is left, the surface temperature increases, and the preform whitens which is not preferable.

The temperature of the body part of the preform at the time of extracting preforms increases or decreases depending on the temperature of the dies during compression molding or on the cooling time. However it is possible to perform immediately the stretch blow molding by performing even-heating of the body part of the preform at 80° C. to 120° C.

When the temperature of the body part of the preform at the extraction of the preform is high (for example, when the surface temperature of the body part is 60 to 120° C.), the whole preform is cooled down by cold air immediately after extraction of the preform, and by further cooling forcibly a part of the preform according to need, so that the temperature of the body part of the preform is homogenized from 80 to 120° C.

When the temperature of the body part of the preform when extracting the preform is appropriate (for example, when the surface temperature of the body part is 50 to 90° C.), a part of the body part of the preform is heated or cooled in an atmosphere of room temperature to about 100° C. immediately after extraction of the preform according to need, and the temperature of the body part of the preform is homogenized from 80 to 120° C.

Further, when the temperature of the body part of the preform when extracting the preform is low (for example, when the surface temperature of the body part is from room temperature to 60° C.), the whole part the body part of the preform is heated, in an atmosphere of room temperature to about 100° C. after extraction of the preform according to need, by hot air and/or infrared heater, and by heating a part of the preform according to need, so that the temperature of the body part of the preform is homogenized from 80 to 120° C.

Meanwhile, the temperature of the preform is generally determined by the molding conditions of the stretch blow molding which follows, and it is preferable that the homogenization of temperature of the preform after extraction of the preform applies a method which depends appropriately to molding conditions according to the above-mentioned examples of homogenization.

The even-heating treatment method is illustrated in FIG. 1 as an even-heating treatment device (even-heating treating mechanism) of preforms which is the main constituting factor in the molding system of the present invention.

Figure 2:
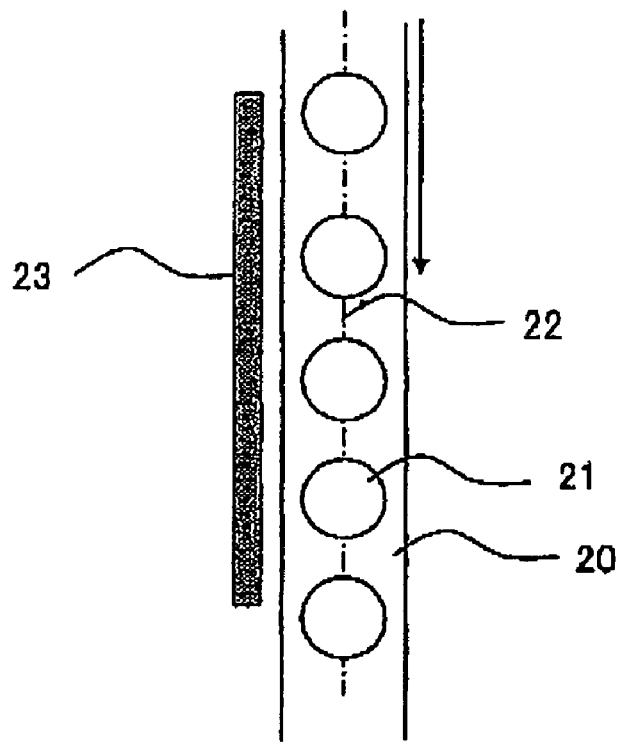
FIG. 2 is a partial plain view that illustrates the even-heating device of the present invention.

Specific examples of the even-heating treating device of preforms are illustrated as a partial plain figure in FIG. 2. As a working example of an even-heating treating device of preforms 20, in parallel with the even-heating treatment under even-heating treatment conditions including temperature, humidity or treatment time, which were determined in advance by experimental considerations, partial even-heating treatment is performed with a partial heating device 23 to the compression-molded preform 21, and each preform is transported along preform transporting strip 22 and sent to the stretch molding machine.

By the even-heating treatment, thermal conditions including potential heat for each preform after molding by compression will be constant and the preforms will be sent to stretch blow molding process, thus a homogeneous blow molding can be realized and synthetic resin containers with a constant level of property can be manufactured continuously.

Further, the temperature of each part (body part or bottom part) of each preform, immediately after compression molding, is higher in the intermediate layer compared to inner and outer layers. However, with the even-heating treatment in which each preform is placed in a certain heat atmosphere, it is possible to homogenize the temperature of the preform in the thickness direction during the time up to stretch blow molding, and to mold containers having homogeneous layers.

2-3 Partial Heating or Cooling Treatment of Preform

The present invention has an other constitution, to perform a partial heating treatment and/or a partial cooling treatment to the preform in addition to the even-heating treatment, and it is possible to perform a supplemental heating treatment by a partial heating and/or partial cooling treatment of preforms, according to the experimental data of preforms as necessary, and to adjust (make minor arrangement) the thermal conditions of preforms according to stretch blow conditions.

The partial heating/partial cooling treatment of preforms is performed with a partial heating device/partial cooling device and usual heating machines or cooling machines such as infrated heater (or cold air) are used. As a working example in FIG. 2, a partial heating device (partial heating mechanism) 23 wherein a partial heating treatment is added while applying even-heating treatment of preforms is illustrated.

2-4 Continuous Molding System

In the present invention, in order to mold preforms continuously and to enhance the production efficiency, a rotary- and movable type drop supply comprising a plurality of holding mechanism that holds and carries a determined amount of drops, and provides thereof to the molding dies of the compression molding machine is preferably used. Thus, a continuous molding system, wherein:

the compression molding machine is a rotary movable type with a plurality of molding dies comprising male and female dies;

the even-heating mechanism of preforms is an even-heating treatment device which treats a plurality of preforms; and the stretch blow molding machine is a rotary-type stretch blow molding machine that performs stretch blow molding continuously to a plurality of preforms, is applied.

The continuous molding system is illustrated in the schematic pattern diagram in FIG. 1, as described in the (1) fundamental constitution of the present invention.

(3) Others 3-1 Heating and Crystallizing Process of the Neck Part

In the present invention, preferably, a process for heating and crystallizing the neck part of the container is further added, according to need. This process is used generally for stretch blow molding of synthetic resin containers represented by polyethylene terephthalate, and is used to heat, whiten and crystallize only the neck part of the preform, in order to enhance the strength of the neck part. This crystallization process can be performed either before or after stretch blow molding.

3-2 Embodiment of Each Part in the Molding System

[Molten Resin Supplying Mechanism]

Figure 3:
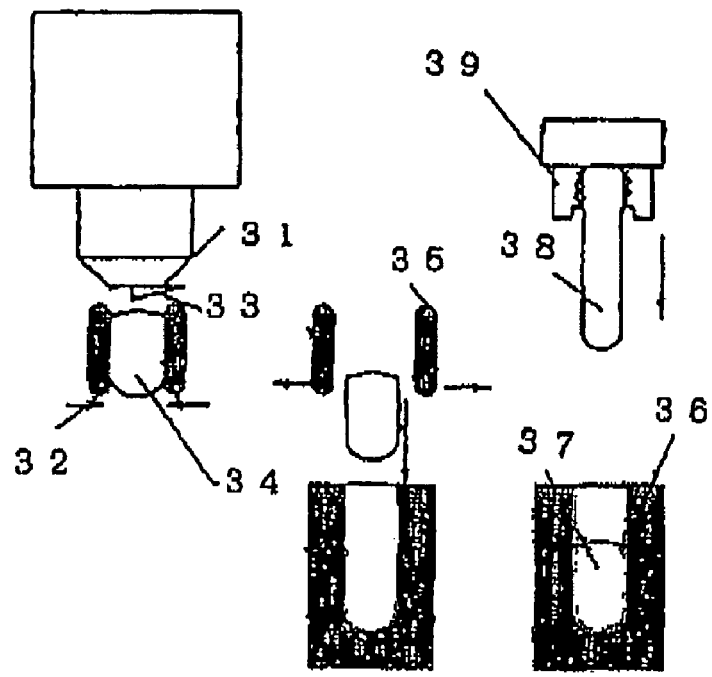
FIG. 3 is a schematic view that illustrates the holding and carrying process of the molten resin drop and input thereof to the compression molding dies.

The molten resin supplying mechanism, as schematically exemplified in FIG. 3, comprises the extrusion die head 31 of the extrusion machine and the molten resin cutting carrying device 32. The molten resin cutting carrying device cuts the synthetic resin extruded from the extrusion die head opening, being melted and mixed with an extrusion machine, with a cutting device 33 at determined time intervals, when it is carried via the synthetic resin receiving position opposing to the extrusion die head, to form a determined amount of drop (1 ump of molten resin) 34. The synthetic resin drop is held by a holding carrying mechanism 35 in the molten resin cutting carrying mechanism, and carried to the molding die 36 of the compression molding machine.

[Compression Molding Device]

The compression molding device comprises a plurality of molding dies 36 on a rotating disk, the die comprises a female die 37 and the male die 38 disposed in a perpendicular direction concentrically, wherein opening and closing is free. The female die is fixed to the rotating disk and has a cavity corresponding to the outer shape of the preform. The male die is able to move up and down by such as a hydraulic mechanism, and in the upper part of male die, the driven type 39 is provided to form the top part of the preform.

The drop carried to the compression molding device by the molten resin cutting carrying device, is dropped and injected in the cavity of the female die when the holding device of the holding carrying mechanism releases the holding of the drop at the upper part of the female die. Then, mold clamping of the cavity is performed, and the male die and the driven type fall, the molten resin fill the preform-forming space determined by the female and male dies, and a perform is molded after a determined time of pressing at a determined temperature. After cooling the die, the die is released, the male die moves in the upper direction and the preform is extracted from the cavity, together.

[Even-Heating Treatment and Partial Heating Treatment]

Molded preforms are discharged from the compression molding device with a preform discharging device, carried to the even-heating device, and by considering the thermal conditions of preforms immediately after compression by molding, and the stretch blow molding conditions of the process which follows, the even-heating treatment and the partial heating cooling treatment mentioned in the above 2-2 and 2-3, are performed according to need.

[Stretch Blow Molding]

After the even-heating treatment and the partial heating/cooling treatment, preforms adjusted to a temperature appropriate to stretch blow molding (thermal condition) is injected to a rotary-type stretch blow molding machine. By performing blow molding by double-axis stretch, or/further two-step blow by infiltration of pressurized fluid such as pressurized air, preforms are stretched to the determined draw ratio to become container as products such as bottles or cups.

Molded container products are discharged from the product discharging device, collected and sent to the product inspection process.

Meanwhile, an embodiment wherein the rotary trajectory of a rotary- and movable type drop supply comprising a plurality of holding mechanisms, and the rotary trajectory of a rotary-and movable type comprising a plurality of dies in the rotary-type compression molding machine overlap, to drop the drop in the overlapped trajectory is preferable as the drop is injected in the female die concave portion precisely.

EXAMPLES

In the following, the present invention will be explained with referring to more specific examples, while the present invention will be not limited to these.

Molding was performed by using molding system devices shown in the above-mentioned FIGS. 1 to 3, that exemplify preferable embodiments of the present invention.

Example 1

Synthetic resin (polyethylene terephthalate) heated and melted in the extrusion machine, was extruded continuously from the opening of the die head fixed to the tip of the extrusion machine, and the molten resin is cut with a cutting device to obtain a columnar drop (cut molten lump). The drop is pinched, held and carried by a fixing device and pressing device of the plurality of holding mechanisms provided to the rotary-and movable type drop supply, inserted to the female die of the molding dies provided to the rotary compression molding machine, and by performing compression molding with the cooperation of the female die with the male die, preforms were obtained.

Molded preforms were discharged with the discharging device, and transported immediately to the even-heating device of preforms. The surface temperature of preforms at that time was 60° C. at the nozzle part, and 100° C. at the body part.

In the even-heating device, the whole preform was cooled down for 30 sec with a cold air of 15° C., and after homogenizing the temperature of the body part of the preform at 100° C., preforms were transported to a rotary-type two-axis stretch blow molding machine, and two-axis strech blow molding was performed to obtain stretched bottles.

Example 2

By performing compression molding similarly to Example 1, with minor variation to the molding conditions, the surface temperature of the preforms discharged from the compression molding machine was 55° C. at the nozzle part, and 80° C. at the body part.

Then, after keeping the heat in the atmosphere of 80° C. for 30 sec in the even-heating device, preforms were transported to a rotary-type two-axis stretch blow molding machine, and two-axis strech blow molding was performed to obtain stretched bottles.

Example 3

By performing compression molding similarly to Example 1, with minor variation to the molding conditions, the surface temperature of the preforms discharged from the compression molding machine was 50° C. at the nozzle part, and 60° C. at the body part.

Then, after keeping the heat in the atmosphere of 100° C. for 30 sec, preforms were transported to a rotary-type two-axis stretch blow molding machine, and two-axis strech blow molding was performed to obtain stretched bottles.

Comparative Example 1

Every process was performed similarly to Example 1, except that the even-heating treatment of Example 1 was not performed.

Comparative Example 2

Every process was performed similarly to Example 2, except that the even-heating treatment of Example 2 was not performed.

Comparative Example 3

Every process was performed similarly to Example 3, except that the even-heating treatment of Example 3 was not performed.

Results of the Examples and the Comparative Examples

In each of the examples, bottles were molded normally as intended and molded products with a constant level of quality, having excellent mechanical properties and the like were obtained.

On the other hand, in Comparative example 1, the surface temperature of the body part of the preform discharged from the compression molding machine increased to 160° C., and the whole body part whitened. In Comparative examples 2 and 3, as the temperature of a part or the whole of performs was low, normal blow molding could not be performed as intended.

From the above results of each example and each comparative example, the effectiveness and the necessity of the even-heating treatment requirement could be understood.

INDUSTRIAL APPLICABILITY

In the present invention, a method wherein molding method of preforms is combined with stretch blow molding to make a compression stretch blow molding is industrialized, to make a system continued from compression molding to stretch blow molding in order to realize excellent production efficiency of preforms. Further, by applying the new heating technology, problems including transformation of performance caused by the temperature variation of the preform; or by the variation in the stretching blow molding due to a thermal difference between the surface and the inner part of the preform, resulting from the thickness thereof, can be resolved and thus, container product with a constant level of quality can be obtained. Moreover, as the molding machines of the compression molding machine and the stretch blow molding machine are adjacent but independent each other, the most appropriate molding time can be selected and set for each molding.

Further, with a unique even-heating treatment, the potential heat of each preform after compression molding will be constant and the preforms will be sent to stretch blow molding process. Thus, a homogeneous blow molding can be realized, and synthetic resin containers with a certain quality can be manufactured continuously.

Further, the temperature of each part (body part or bottom part) of each preform, immediately after compression molding, is higher in the intermediate layer compared to inner and outer layers. However, with the even-heating treatment in which each preform is placed in a certain heat atmosphere, it is possible to homogenize the temperature of the preform in the thickness direction during the time up to stretch blow molding, and to mold containers having homogeneous layers. Thus, containers having homogenous layer can be molded. Meanwhile, the temperature of the preform is stabilized at a constant level and the reproducibility of molding is also good.

Further, the present invention has another constitution, to perform a partial heating treatment and/or a partial cooling treatment to the preform in addition to the even-heating treatment, and it is possible to perform a supplemental heating treatment by a partial heating and/or cooling treatment to preforms, and to adjust (make minor arrangement) the thermal conditions of preforms according to stretch blow conditions.

Meanwhile, in the present invention, as normal heating treatment of preforms is not performed, there is no fear of deterioration including carbonization on the surface of preform due to heating, and incidental facilities for heating preforms or heat energy can be reduced. With a minimum heating, degradation of synthetic resin can be decreased.

As mentioned above, the present invention realized to industrialize a new molding method by combining compression molding and stretch blow molding continuously, which can be said to be an excellent molding method from the point of view of economic efficiency and production efficiency. The present invention is useful in the industry of plastic molding and plastic containers, which has a large possibility for industrial use.

The invention claimed is:
1. A method for manufacturing a synthetic resin container, comprising:
    forming a preform by performing compression molding on a drop which is a synthetic resin molten lump with a compression molding machine;
    performing an even-heating treatment of the preform discharged from the compression molding machine while the preform maintains heat conferred during compression molding, thereby obtaining an evenly-heated preform with a homogenized temperature in a thickness direction; and performing stretch blow molding on the evenly-heated preform with a stretch blow molding machine,
wherein the compression molding, the even-heating treatment, and the stretch blow molding are continuously performed without cooling the preform formed by the compression molding to a room temperature.

2. The method for manufacturing a synthetic resin container according to claim 1, wherein the even-heating treatment comprises a heating and/or cooling.

3. The method for manufacturing a synthetic resin container according to claim 1, wherein even-heating treatment of the preform comprises a partial heating and/or partial cooling treatment according to the temperature of the body part of the preform.

4. The method for manufacturing a synthetic resin container according to claim 1, further comprising heating and crystallizing a neck part of the container.

5. The method for manufacturing a synthetic resin container according claim 1, wherein:
the compression molding is performed by a rotary compression molding machine including a plurality of molding dies comprising male and female dies;
the even-heating treatment is performed by a device of a rotary mechanism which treats a plurality of preforms; and
the stretch blow molding is performed by a rotary-type stretch blow molding machine that performs stretch blow molding continuously on a plurality of preforms.

6. The method for manufacturing a synthetic resin container according to claim 1, wherein the stretch blow molding is a double-axis stretch blow, or a two-step blow.

7. A device for manufacturing a synthetic resin container comprising:
an extruder including an extrusion opening;
a drop cutter to cut a drop which is a synthetic resin molten lump extruded from the extrusion opening;
a compression molding machine to compress the drop forming a preform;
a carrying device to carry the drop from the drop cutter to the compression molding machine;
a even-heating device to heat-treat the preform obtaining a evenly-heated preform;
a preform discharger to discharge the preform from the compression molding machine and to carry to the even-heating device;
a stretch blow molding machine to form the evenly-heated preform into a container product; and
a container product discharger,
wherein the extruder, the drop cutter, the compression molding machine, the heater, the stretch blow molding machine are constituted as a continuous system.

8. The device for manufacturing a synthetic resin container according to claim 7, wherein said even-heating device include a heater for partial heating and/or cooling device for partial cooling.

9. The device for manufacturing a synthetic resin container according to claim 7, further comprising a second heater to heat and crystallize a neck part of the container is further added.

10. The device for manufacturing a synthetic resin container according to claim 7, wherein:
the carrying device is a rotary conveyer provided with a plurality of drop holder, which holds and carries a drop to a molding die of the compression molding machine;
the compression molding machine is a rotary compression molding machine including a plurality of molding dies comprising male and female dies;
the even-heating device is of a rotary mechanism which treats a plurality of preforms; and
the stretch blow molding machine is a rotary-type stretch blow molding machine that performs stretch blow molding continuously to a plurality of preforms.

11. The device for manufacturing a synthetic resin container according to claim 7, wherein the stretch blow molding is a double-axis stretch blow, or a two-step blow, and the synthetic resin container is a bottle or a cup.

* * * * *